(12) United States Patent
Yao

(10) Patent No.: US 10,296,107 B2
(45) Date of Patent: May 21, 2019

(54) HAND HELD MANIPULATION APPARATUS COMPRISING BUTTONS, DIRECTIONAL CONTROL LEVER AND A FLEXIBLE CONDUIT

(71) Applicant: Bing-Yang Yao, Taipei (TW)

(72) Inventor: Bing-Yang Yao, Taipei (TW)

(*) Notice: Subject to any disclaimer, the term of this patent is extended or adjusted under 35 U.S.C. 154(b) by 69 days.

(21) Appl. No.: 15/581,623

(22) Filed: Apr. 28, 2017

(65) Prior Publication Data

US 2017/0315633 A1 Nov. 2, 2017

(30) Foreign Application Priority Data

Apr. 29, 2016 (TW) .............................. 105113614 A

(51) Int. Cl.
| | |
|---|---|
| *G06F 3/0354* | (2013.01) |
| *G06F 3/038* | (2013.01) |
| *A63F 13/23* | (2014.01) |
| *A63F 13/42* | (2014.01) |
| *G06F 3/0338* | (2013.01) |
| *G06F 3/0346* | (2013.01) |
| *A63F 13/211* | (2014.01) |
| *A63F 13/24* | (2014.01) |
| *G05G 9/047* | (2006.01) |
| *G06F 3/033* | (2013.01) |

(52) U.S. Cl.
CPC ........ *G06F 3/03543* (2013.01); *A63F 13/211* (2014.09); *A63F 13/23* (2014.09); *A63F 13/24* (2014.09); *A63F 13/42* (2014.09); *G06F 3/0338* (2013.01); *G06F 3/0346* (2013.01); *G06F 3/0383* (2013.01); *G05G 9/047* (2013.01); *G06F 3/033* (2013.01)

(58) Field of Classification Search
None
See application file for complete search history.

(56) References Cited

U.S. PATENT DOCUMENTS

| | | | | |
|---|---|---|---|---|
| 5,984,785 | A * | 11/1999 | Takeda .................... | A63F 13/02 345/156 |
| 6,464,585 | B1 * | 10/2002 | Miyamoto ........... | G10H 1/0008 463/30 |
| 6,882,334 | B1 * | 4/2005 | Meyer ................... | G06F 3/0231 340/6.1 |
| 2005/0159850 | A1 * | 7/2005 | Melman .............. | F16H 59/0217 701/1 |
| 2006/0274045 | A1 * | 12/2006 | Stenbroten ............ | G06F 3/0219 345/168 |

(Continued)

*Primary Examiner* — Kent W Chang
*Assistant Examiner* — Nathaniel P Brittingham

(57) ABSTRACT

A manipulation apparatus includes a body, a connection cable, a connector, and a flexible conduit. The body includes a control element, buttons, and a directional control lever. The control element is in the body and is configured to receive a control signal generated by the buttons and the directional control lever. The buttons are at a first side of the body, and the directional control lever is at a second side of the body. The connection cable is connected to the control element. The connection cable includes a first end and a second end, and the first end is connected to a third side of the body. The connector is connected to the second end of the connection cable. A flexible conduit is outside the connection cable in a sleeve manner, where the flexible conduit extends from the first end of the connection cable to the second end.

7 Claims, 8 Drawing Sheets

(56) References Cited

U.S. PATENT DOCUMENTS

| | | | | |
|---|---|---|---|---|
| 2007/0050597 A1* | 3/2007 | Ikeda | ............... | A63F 13/06 |
| | | | | 712/1 |
| 2008/0064109 A1* | 3/2008 | Okamura | ............ | A63F 13/10 |
| | | | | 436/36 |
| 2008/0222571 A1* | 9/2008 | Yoshioka | ............ | A63F 13/06 |
| | | | | 715/841 |
| 2010/0009754 A1* | 1/2010 | Shimamura | ............ | A63F 13/10 |
| | | | | 463/37 |
| 2011/0263328 A1* | 10/2011 | Yamashita | ............ | A63F 13/213 |
| | | | | 463/36 |
| 2013/0270002 A1* | 10/2013 | Fawcett | ............ | H01R 11/01 |
| | | | | 174/84 S |
| 2017/0315633 A1* | 11/2017 | Yao | ............... | G06F 3/03543 |

* cited by examiner

HAND HELD MANIPULATION APPARATUS COMPRISING BUTTONS, DIRECTIONAL CONTROL LEVER AND A FLEXIBLE CONDUIT

CROSS-REFERENCE TO RELATED APPLICATION

This non-provisional application claims priority under 35 U.S.C. § 119(a) to Patent Application No. 105113614 filed in Taiwan, R.O.C. on Apr. 29, 2016, the entire contents of which are hereby incorporated by reference.

BACKGROUND

Technical Field

The present invention relates to a controller, and in particular, to a manipulation apparatus capable of being held by a user with one hand and can be configured to manipulate a computing device.

Related Art

Nowadays, computing devices such as a computer, a notebook computer, a virtual reality apparatus, or a television game console all need to be operated by a user by using a corresponding manipulation apparatus. Using a computer as an example (such as a desktop computer), when operating the computer, a user needs to use a keyboard and a mouse in cooperation, so as to implement an optimal operation effect. Using a notebook computer as an example, although a touchpad is usually accompanied for the user to operate, the touchpad is still not as convenient as a mouse in an operation. Therefore, the user usually externally connects a mouse to the notebook computer to facilitate the operation. However, as to a television game console, the user also needs to perform an operation by using a controller corresponding to the television game console. In addition, currently, the television game console also corresponds to a keyboard and a mouse, so as to facilitate an operation of a particular game.

SUMMARY

No matter a computer or a game console is operated by using a mouse, use of the mouse has many limits. For example, the mouse can only be operated in a particular moving range, and correspondingly, at least a part of empty desktop space also needs to be maintained, so that the empty space can be used as moving space of the mouse. During an operation, a user also needs to sit up in front of a desk so as to operate the mouse. If operating a television game console with a controller, a user needs to hold the controller by hand for a long time. However, after holding the controller for a long time, the user feels tired and uncomfortable in his hands. In addition, if the television game console is operated by using a keyboard in cooperation with the controller, when the keyboard needs to be operated, the user first needs to lay the controller aside, and after the keyboard is used, the user picks up the controller again. The operation manner is inconvenient.

In view of this, the present invention provides a manipulation apparatus, to resolve the problems that currently a mouse needs to occupy desktop space and when a user uses an existing controller, the user needs to hold the controller by hand for a long time and feels tired and uncomfortable in his hands, and to further improve a complicated operation manner that when the controller is used in cooperation with the mouse, the controller needs to be laid down and then picked up frequently.

In an embodiment of the present invention, a manipulation apparatus includes a body capable of being held with one hand, a connection cable, a connector, and a flexible conduit. The body capable of being held with one hand includes a control element, a button, and a directional control lever. The control element is located in the body and is configured to receive a control signal generated by the button and the directional control lever, the button is located at a first side of the body, and the directional control lever is located at a second side of the body. A side of the first side is connected to a side of the second side. The connection cable is connected to the control element, the connection cable includes a first end and a second end opposite to each other, and the first end is connected to a third side of the body. A side of the third side is connected to another side of the second side far away from the first side, or a side of the third side is connected to another side of the first side far away from the second side. The connector is connected to the second end of the connection cable. A flexible conduit is disposed outside the connection cable in a sleeve manner, where the flexible conduit extends from the first end of the connection cable to the second end.

In an embodiment of the present invention, there are two buttons.

In an embodiment of the present invention, the body includes a groove, the groove is recessed into the third side of the body, the first end of the connection cable is connected to the control element through the groove, and a width of the groove is substantially equal to a diameter of the flexible conduit.

In an embodiment of the present invention, the groove is a cross and the first end of the connection cable is connected to the control element through a center of the cross of the groove. In addition, a part of the flexible conduit may be selectively fitted in the groove.

In an embodiment of the present invention, the control element includes a gravity sensor. In addition, the control element may further include a gyroscope.

In another embodiment of the present invention, the manipulation apparatus may be configured to be connected to a keyboard, and the connector is configured to be connected to a connection port of the keyboard.

In still another embodiment of the present invention, the manipulation apparatus may be configured to be connected to a keyboard set, where the keyboard set includes a left keyboard and a right keyboard, the left keyboard is in communication connection with the right keyboard, and the connector is configured to be connected to a connection port of the left keyboard or the right keyboard.

In an embodiment of the present invention, the flexible conduit is made of metal.

In conclusion, according to the manipulation apparatus of each embodiment of the present invention, the flexible conduit matches a hand posture of a user when the user operates the manipulation apparatus, and a degree of comfort of the user is improved. In addition, the body can be hung in the air and does not need to occupy desktop space. The user does not need to first lay down the body and then uses a keyboard, but only needs to release a hand that holds the body and operate the keyboard instead. Therefore, the manipulation apparatus is more convenient in use.

The following implementation manners describe in detail features and advantages of the present invention. The content enables any person skilled in the art to know technical content of the present invention and implement the technical content. A person skilled the art can easily understand the objectives and advantages of the present invention according to the content, the application scope, and drawings disclosed in this specification.

DETAILED DESCRIPTION

Figure 1:
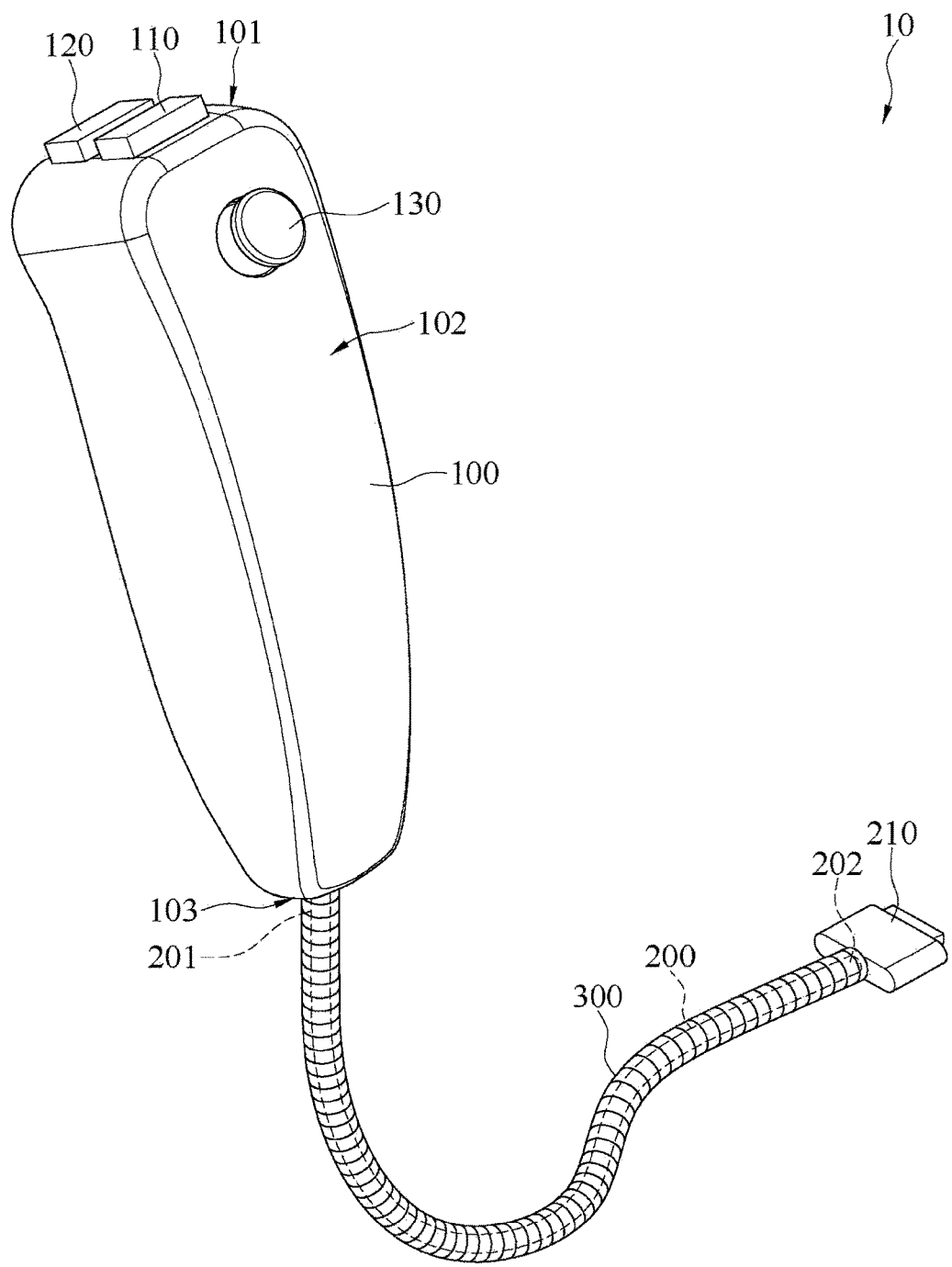
FIG. 1 is a schematic diagram of a manipulation apparatus according to a first embodiment of the present invention.
Figure 2:
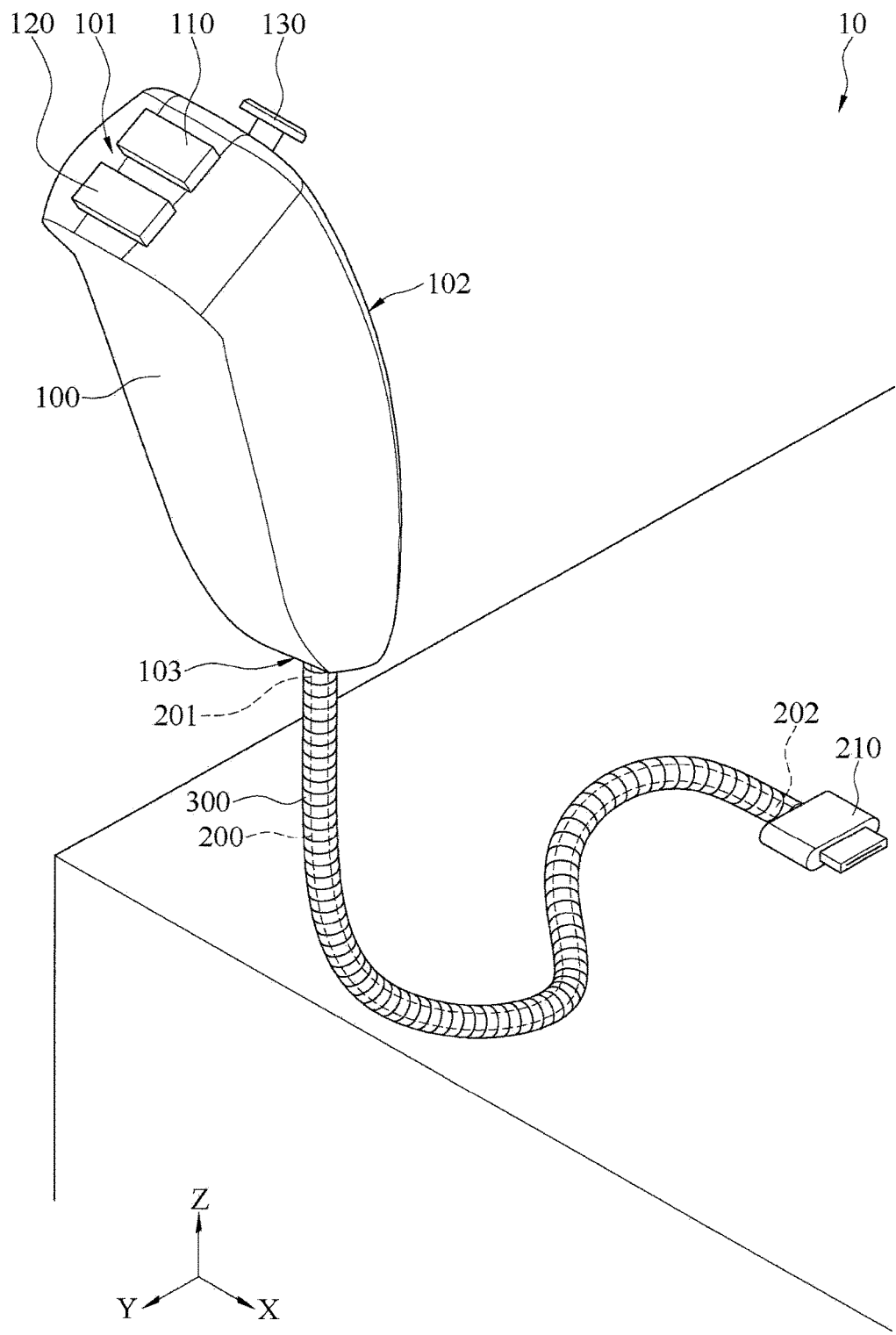
FIG. 2 is a schematic diagram of the manipulation apparatus at another angle according to the first embodiment of the present invention.

Referring to FIG. 1 and FIG. 2, FIG. 1 is a schematic diagram of a manipulation apparatus 10 according to a first embodiment of the present invention, and FIG. 2 is a schematic diagram of the manipulation apparatus 10 at another angle according to the first embodiment of the present invention. In this embodiment, the manipulation apparatus 10 can be operated and used by a user with one hand and can be configured to operate a computing device, which includes, but is not limited to, a desktop computer or a notebook computer. That is, a common mouse can be replaced with the manipulation apparatus 10. The manipulation apparatus 10 includes a body 100, a connection cable 200, a connector 210, and a flexible conduit 300. The body 100 is a design capable of being held with one hand. In other words, a user can conveniently hold the body 100 with one hand and perform an operation. The body 100 capable of being held with one hand includes a control element (also known as control board, not shown in the figure), two buttons 110 and 120, and a directional control lever 130. The control element is disposed inside the body 100. The control element includes, but is not limited to, for example, a circuit board, integrated circuits, driving circuits, resistors, capacitors, an inductor, and various electronic elements, whose main functions are to receive a control signal generated by the buttons 110 and 120 and the directional control lever 130, generate an output signal, and transmit the output signal to the computing device. In this way, the user can operate an operating system, an application program, or a game runs on the computing device by holding the body 100 and using the buttons 110 and 120, and the directional control lever 130. A person skilled in the art should be familiar with the control element, and details are not described herein again. In another embodiment, the manipulation apparatus 10 may also be configured to operate a television game console, such as a Play Station 4 or an XBOX One.

In this embodiment, the manipulation apparatus 10 may be configured to operate a computer that runs a Windows OS. In this case, the buttons on the body 100 are two buttons 110 and 120, which may respectively correspond to a left button and a right button of a common mouse. In another embodiment, the manipulation apparatus 10 may be configured to operate a computer that runs a Mac OS of a particular version. In this case, the buttons on the body 100 may be two buttons 110 and 120, or may be only one button (not shown in the figure). In this embodiment, the directional control lever 130 may correspond to operations of moving towards multiple directions of a mouse cursor, such as operations of moving towards eight directions (up, down, left, right, upper-left, upper-right, lower-left, and lower-right), but the operations are not limited thereto. For example, when the user pushes the directional control lever 130 forward, the mouse cursor on a screen of the computer moves towards an upper area of the screen; when the user pulls the directional control lever 130 back, the mouse cursor moves towards a lower area of the screen; when the user pushes the directional control lever 130 to the left, the mouse cursor moves to the left area of the screen; and when the user pushes the directional control lever 130 to the right front, the mouse cursor moves to the upper right area of the screen. In this embodiment, the directional control lever 130 may further correspond to a middle button of a common mouse, and when the user presses down the directional control lever 130 towards a direction of the body 100, the effect is equivalent to pressing the middle button of the mouse. In addition, the directional control lever 130 may further correspond to a scroll wheel of a common mouse. When the user presses down the directional control lever 130 and further moves the directional control lever 130, the effect is equivalent to scrolling the scroll wheel of the common mouse. For example, when the user presses down the directional control lever 130 and pushes the directional control lever 130 forward, the effect is equivalent to scrolling forward the scroll wheel of the common mouse.

In this embodiment, the buttons 110 and 120 are located at a first side 101 of the body 100, and the directional control lever 130 is located at a second side 102 of the body 100. A side of the first side 101 is connected to a side of the second side 102, that is, the first side 101 and the second side 102 of the body 100 are adjacent to each other. In addition, the two buttons 110 and 120 are adjacent to each other and arranged at the first side 101 in upper and lower arrangement. When the user holds the body 100, an index finger of the user corresponds to a location of the upper button 110, a middle finger corresponds to a location of the lower button 120, and a thumb corresponds to a location of the directional control lever 130. That is, the user may press the upper button 110 by using the index finger, press the lower button 120 by using the middle finger, and press or push, or pull the directional control lever 130 by using the thumb.

The connection cable 200 is connected to the body 100 and the control element inside the body 100 (the connection cable 200 is a dotted line part located in the flexible conduit 300 in the FIG. 1 and FIG. 2). Specifically, the connection cable 200 is fixed in the body 100, and runs through the body 100 and is connected to the control element inside the body 100. For example, the connection cable 200 is soldered to a corresponding circuit, a terminal, or a pad on a circuit board of the control element. Therefore, an output signal generated by the control element may be transmitted to, for example, a computer through the connection cable 200. The connection cable 200 includes a first end 201 and a second end 202 opposite to each other. The first end 201 of the connection cable 200 is connected to a third side 103 of the body 100. In this embodiment, a side of the third side 103 is connected to a side of the second side 102 far away from the first side 101, that is, the third side 103 is opposite to the first side 101. In other words, location relationships between the first end 201 of the connection cable 200 and the buttons 110 and 120 are that the first end 201 is opposite to the buttons 110 and 120. When the user holds the body 100 with one hand, the connection cable 200 extends externally along a wrist part of the user.

The connector 210 is connected to the second end 202 of the connection cable 200. The connector 210 is configured to be interconnected to a corresponding connection port, such as a connection port on a computer or a connection port on a keyboard connected to a computer. When the connector 210 is appropriately connected to the connection port, the body 100 and the computer form a communication connection relationship, and an output signal generated by the body 100 is transmitted to related elements of the computer for further processing through the connection cable 200, the connector 210, and the connection port, so that the computer is operated by using the manipulation apparatus 10. In this embodiment, the connection cable 200 and the connector 210 conform to the Universal Serial Bus (USB) standard, and the connection port is a connection socket conforming to the USB standard, but is not limited thereto.

As shown in FIG. 1 and FIG. 2, the flexible conduit 300 is disposed outside the connection cable 200 in a sleeve manner, and the flexible conduit 300 extends from the first end 201 of the connection cable 200 to the second end 202. The flexible conduit 300 is a conduit having flexibility and a shaping effect to some extents. In this embodiment, the flexible conduit 300 is made of metal. The flexible conduit 300 may also be referred to as a flexible metallic conduit, or a flexible metallic tube or coil. When the user exerts a particular degree of external force (greater than a holding power or a friction force of ring joints of the flexible conduit 300) on the flexible conduit 300, the user may bend, distort, or straighten the flexible conduit 300. Therefore, the user may freely adjust the flexible conduit 300 to a bending degree or a shape as required. Using the manipulation apparatus 10 shown in FIG. 2 as an example, a segment of the flexible conduit 300 of the manipulation apparatus 10 relatively adjacent to the connector 210 is folded to a two-dimensional (relative to an X-Y plane shown in the FIG. 2) S shape, and a segment of the flexible conduit 300 relatively adjacent to the body 100 is folded up (such as in a direction of Z shown in FIG. 2). In this way, the S-shape segment of the flexible conduit 300 may be laid on a bearing surface (such as the desktop shown in FIG. 2), and the body 100 may be maintained in a hung state by means of the up-bent segment of the flexible conduit 300. The user may hold the body 100 with one hand for an operation. In addition, unless the user exerts an enough external force on the flexible conduit 300, a shape of the flexible conduit 300 maintains unchanged, that is, even if the user releases the body 100, the body 100 still maintains the original hung state.

Figure 3:
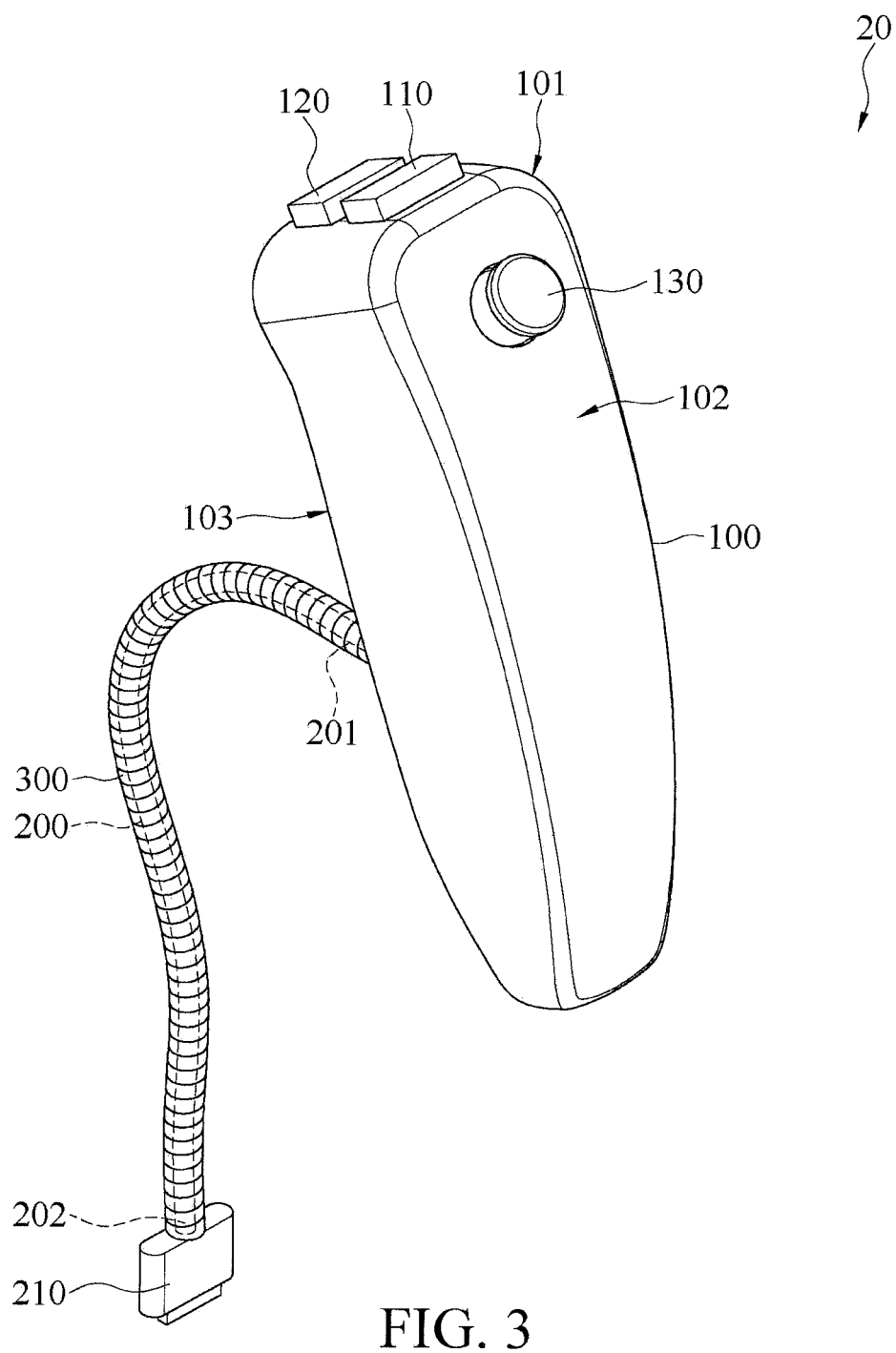
FIG. 3 is a schematic diagram of a manipulation apparatus according to a second embodiment of the present invention.
Figure 4:
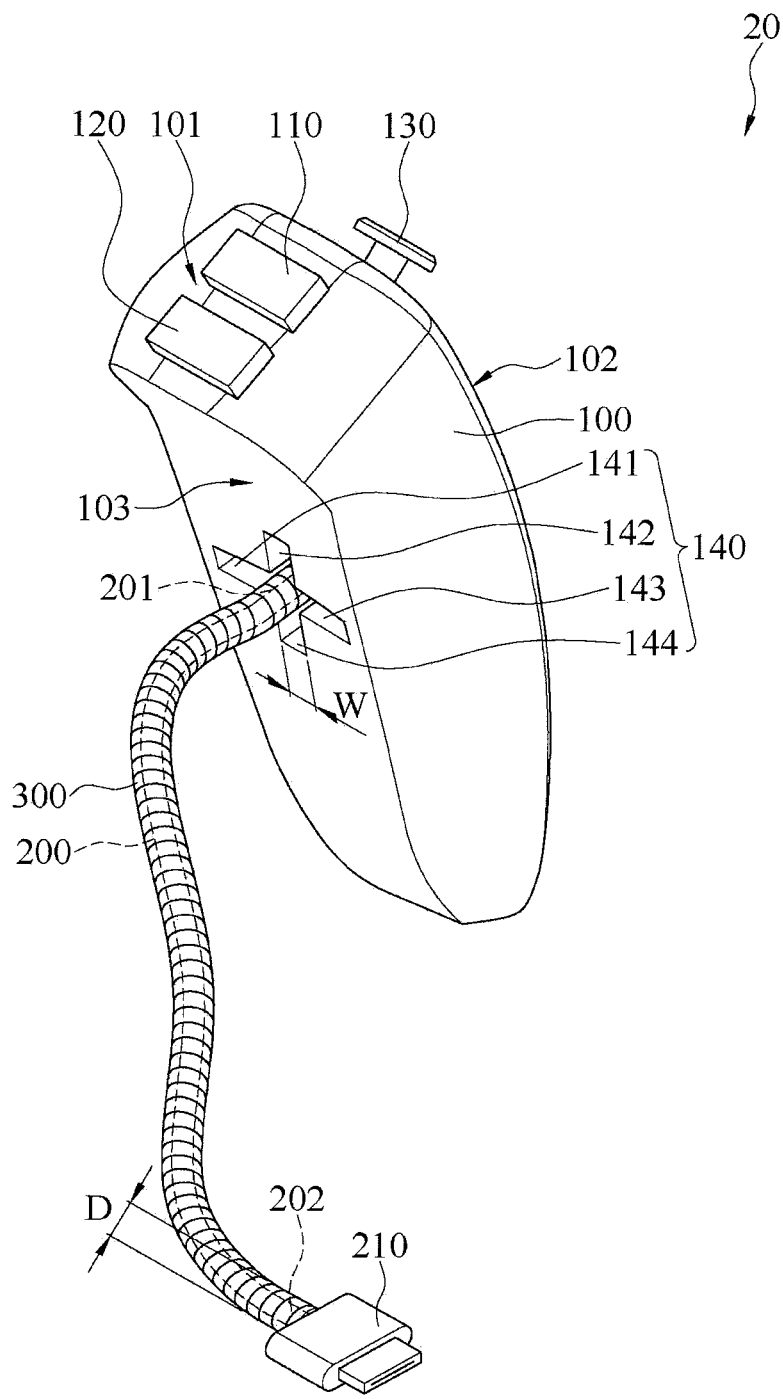
FIG. 4 is a schematic diagram of the manipulation apparatus at another angle according to the second embodiment of the present invention.

Referring to FIG. 3 and FIG. 4, FIG. 3 is a schematic diagram of a manipulation apparatus 20 according to a second embodiment of the present invention, and FIG. 4 is a schematic diagram of the manipulation apparatus 20 at another angle according to the second embodiment of the present invention. A difference between the manipulation apparatus 10 of the first embodiment shown in FIG. 1 and FIG. 2 and the manipulation apparatus 20 of the second embodiment shown in FIG. 3 and FIG. 4 lies in connection locations between the connection cable 200 and the flexible conduit 300 and the body 100. In addition, the body 100 of the manipulation apparatus 20 of the second embodiment further includes a groove 140. Elements of the manipulation apparatus 20 of the second embodiment same as or similar to those of the manipulation apparatus 10 of the first embodiment are labeled with same element symbols. For structures, connection relationships, and functions of the elements, refer to the foregoing descriptions, and details are not described herein again. The groove 140 is recessed into the third side 103 of the body 100, and in the second embodiment, a side of the third side 103 of the body 100 is connected to another side of the first side 101 far away from the second side 102, that is, the third side 103 is opposite to the second side 102. In other words, the first end 201 of the connection cable 200 and the directional control lever 130 are in an opposite location relationship. When the user holds the body 100 with one hand, the connection cable 200 extends externally in directions of a ring finger and a little finger of the user (that is, extends in a direction far away from the body 100).

As shown in FIG. 4, in this embodiment, the first end 201 of the connection cable 200 is connected to the control element through the groove 140, and a part of the flexible conduit 300 outside the first end 201 of the connection cable 200 is also disposed by plugging into the groove 140. A width of the groove 140 is substantially equal to a diameter of the flexible conduit 300, or a width of the groove 140 is narrowly less than a diameter of the flexible conduit 300. Therefore, a part of the flexible conduit 300 adjacent to the body 100 may be selectively fitted in the groove 140, that is, the groove 140 has a function of hiding a wiring. In this way, when the user holds the body 100, the part of the flexible conduit 300 adjacent to the body 100 does not affect fingers and grip of the user.

As shown in FIG. 4, in this embodiment, the groove 140 is a cross, and the first end 201 of the connection cable 200 is connected to the control element through a center of the cross of the groove 140. The groove 140 includes a first groove 141, a second groove 142, a third groove 143, and a fourth groove 144. The first groove 141, the second groove 142, the third groove 143, and the fourth groove 144 extend from the center of the cross of the groove 140 to four directions. Therefore, the first groove 141, the second groove 142, the third groove 143, and the fourth groove 144 together form the cross. As shown in FIG. 4, the first groove 141, the second groove 142, the third groove 143, and the fourth groove 144 all have a same width W, the flexible conduit 300 has a diameter D, and the width W is substantially equal to or narrowly less than the diameter D.

Figure 5:
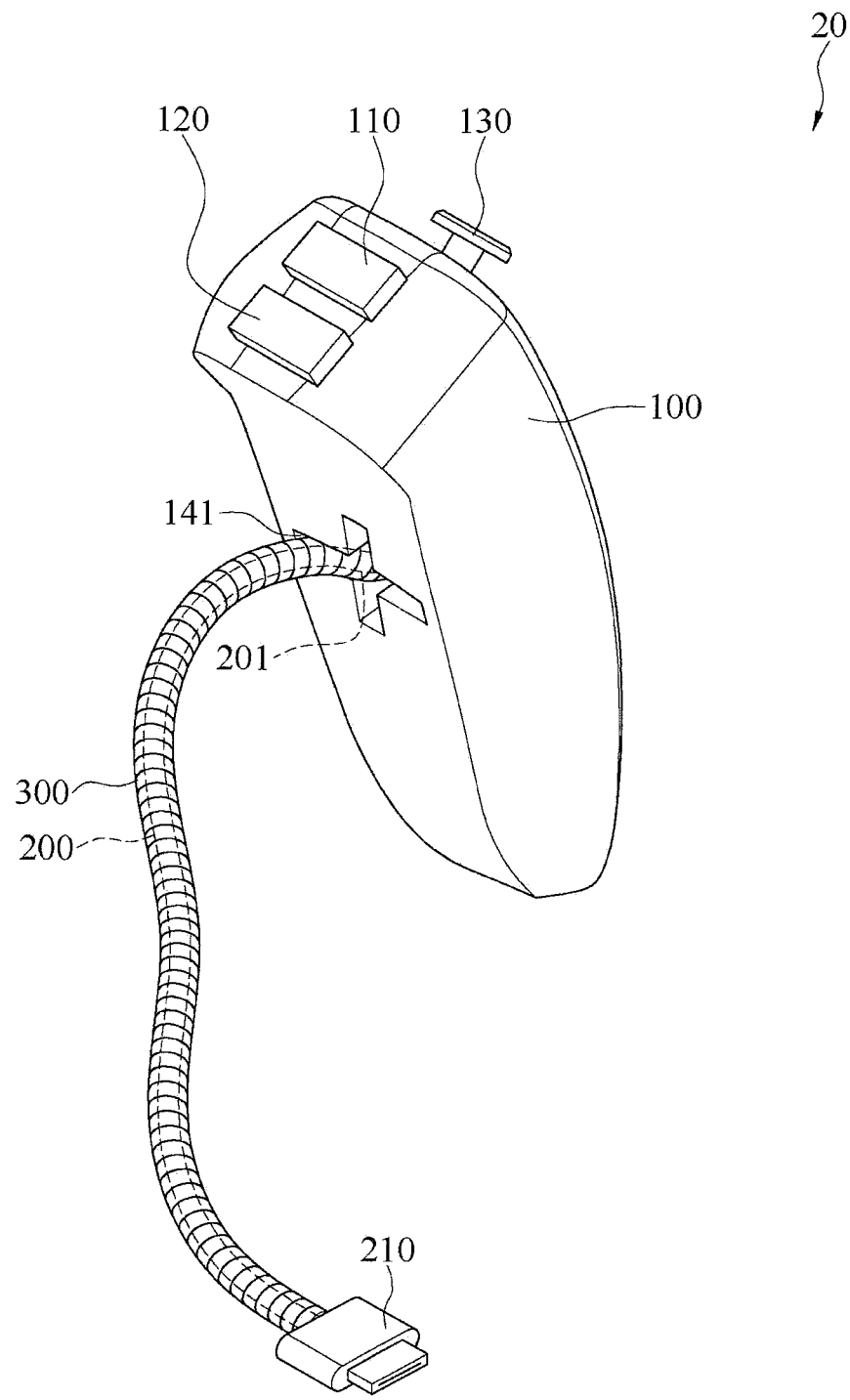
FIG. 5 is a schematic diagram of a use aspect of the manipulation apparatus according to a second embodiment of the present invention.

Referring to FIG. 5, FIG. 5 is a schematic diagram of a use aspect of a manipulation apparatus 20 according to a second embodiment of the present invention. A part of the flexible conduit 300 shown in FIG. 5 adjacent to the first end 201 of the connection cable 200 (that is, a part adjacent to the body 100) is hidden or fitted in the first groove 141. This mode is convenient for a user who is accustomed to using a left hand to hold the body 100 with the left hand. When the left hand holds the body 100, a part of the flexible conduit 300 adjacent to a ring finger and a little finger of the left hand is hidden or fitted in the first groove 141 in a direction of the first groove 141, so as to prevent the part of the flexible conduit 300 from sticking or affecting the ring finger and the little finger of the left hand. In another embodiment, the first groove 141, the second groove 142, the third groove 143, and the fourth groove 144 of the groove 140 may extend farther. For example, the first groove 141 may run through a side of the body 100, so that the part of the flexible conduit 300 adjacent to the first end 201 of the connection cable 200 may be preferably or completely hidden in the first groove 141.

Figure 6:
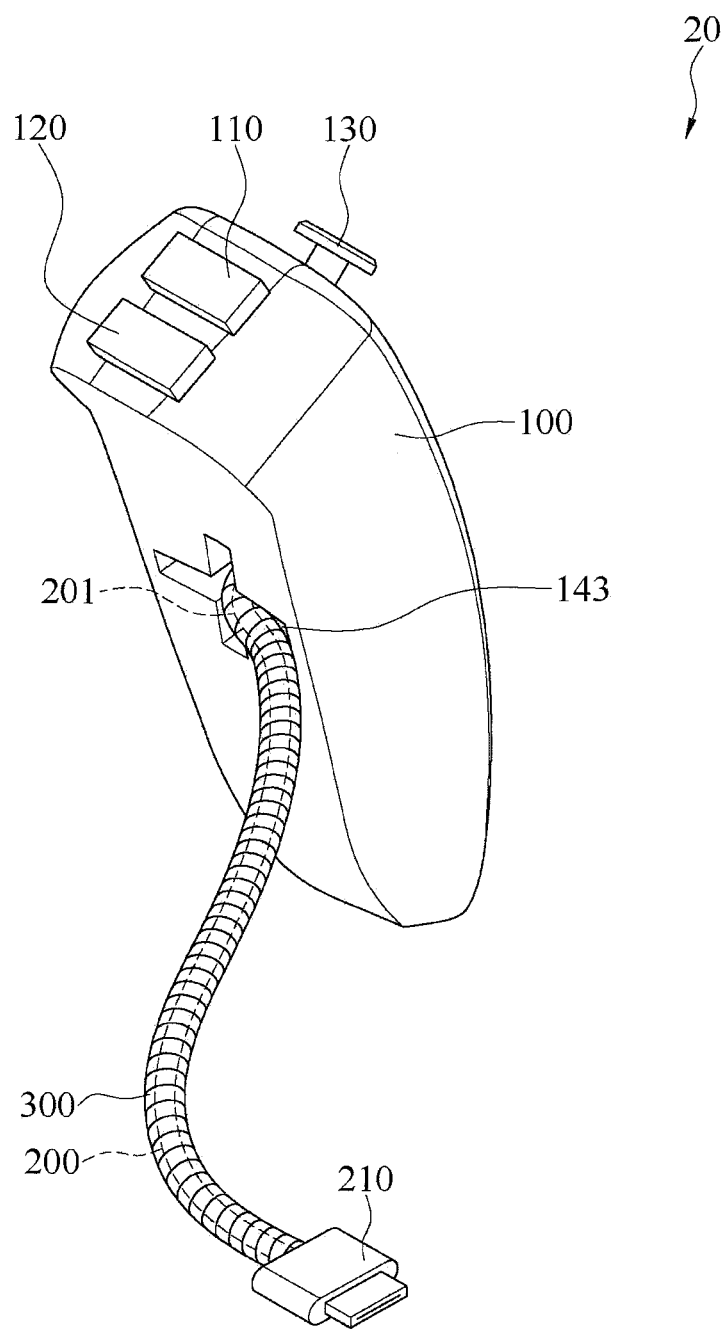
FIG. 6 is a schematic diagram of another use aspect of the manipulation apparatus according to the second embodiment of the present invention.

Referring to FIG. 6, FIG. 6 is a schematic diagram of another use aspect of the manipulation apparatus 20 according to the second embodiment of the present invention. A part of the flexible conduit 300 shown in FIG. 6 adjacent to the first end 201 of the connection cable 200 (that is, a part adjacent to the body 100) is hidden or fitted in a third groove 143. This mode is convenient for a user who is accustomed to using a right hand to hold the body 100 with the right hand. When the right hand holds the body 100, a part of the flexible conduit 300 adjacent to a ring finger and a little finger of the right hand is hidden or fitted in the third groove 143 in a direction of the third groove 143, so as to prevent the part of the flexible conduit 300 from sticking or affecting the ring finger and the little finger of the right hand. In another embodiment, the first groove 141, the second groove 142, the third groove 143, and the fourth groove 144 of the groove 140 may extend farther. For example, the first groove 141 may run through a side of the body 100, so that the part of the flexible conduit 300 adjacent to the first end 201 of the connection cable 200 may be preferably or completely hidden in the first groove 141. In another embodiment, according to differences in preference and using manners of the user, the part of the flexible conduit 300 adjacent to the body 100 may also be hidden or fitted in the second groove 142 or the fourth groove 144. In another embodiment, there may be only one groove 140. For example, there is only the fourth groove 144, so that the part of the flexible conduit 300 adjacent to the body 100 may be hidden or fitted in the fourth groove 144. That is, when the user holds the body 100, the connection cable 200 and the flexible conduit 300 extend externally along a direction of a wrist, and a palm and the wrist of the user are not stuck by the connection cable 200 and the flexible conduit 300.

Figure 7:
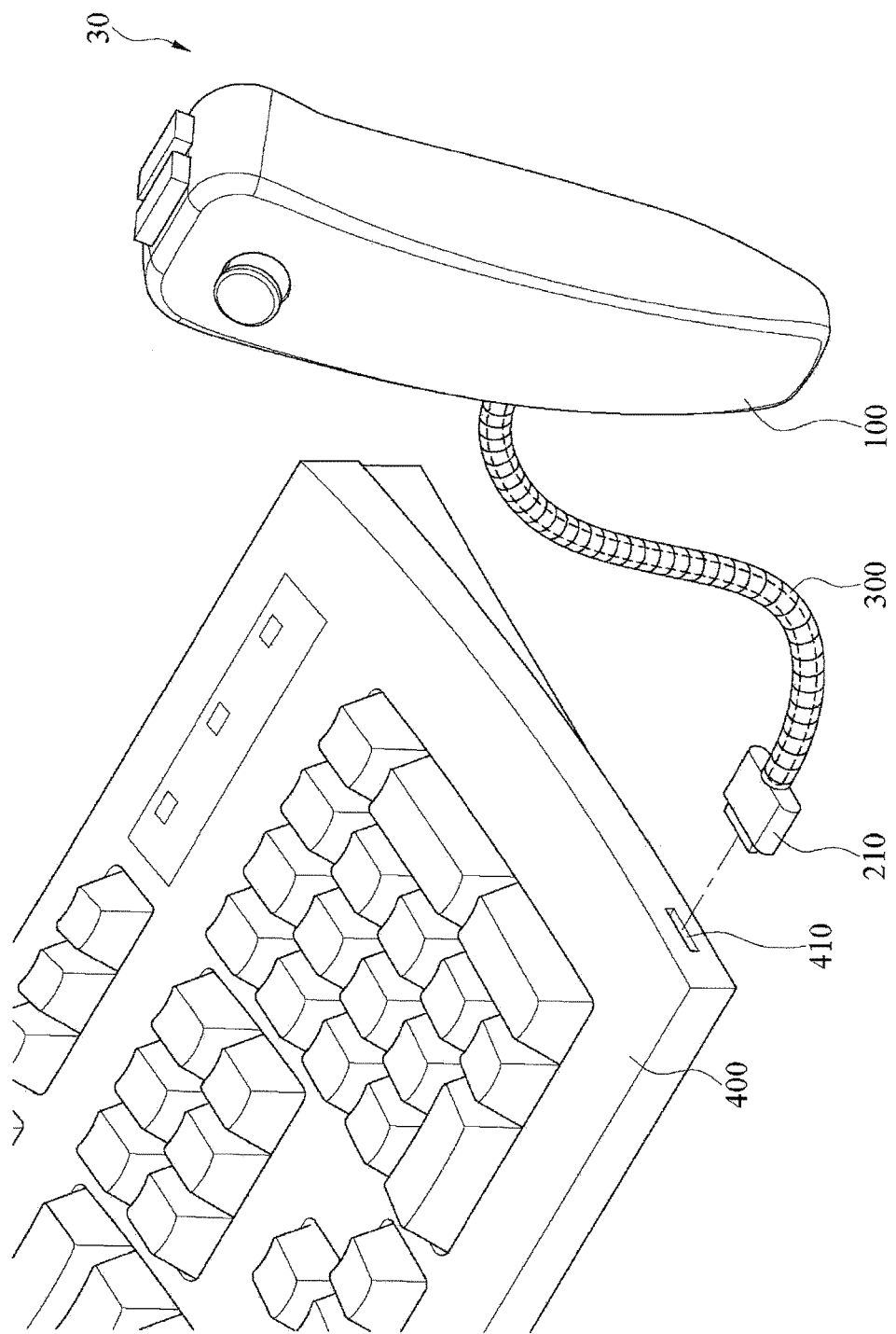
FIG. 7 is a schematic diagram of a manipulation apparatus according to a third embodiment of the present invention.

Referring to FIG. 7, FIG. 7 is a schematic diagram of a manipulation apparatus 30 according to a third embodiment of the present invention. Differences between the manipulation apparatus 30 of the third embodiment shown in FIG. 7 and the manipulation apparatuses 10 and 20 of the first and the second embodiments shown in FIG. 1 to FIG. 6 lie in that the manipulation apparatus 30 may further be configured to be connected to a keyboard 400. That is, the manipulation apparatus 30 may be an extended apparatus of the keyboard 400. Elements of the manipulation apparatus 30 of the third embodiment same as or similar to those of the manipulation apparatuses 10 and 20 of the first and the second embodiments are labeled with same element symbols or ellipses. For structures, connection relationships, and functions of the elements, refer to the foregoing descriptions, and details are not described herein again. The keyboard 400 includes a connection port 410. The keyboard 400 may be in communication connection with a computing device. In an embodiment, the connection port 410 is a connection socket conforming to the USB standard. In other words, the connection port 410 is a USB socket on the keyboard 400, and the connection port 410 may be in communication connection with the computing device by means of the keyboard 400. The connector 210 of the body 100 may be plugged into and electrically connected to the connection port 410, so that the control element of the body 100 may also be in communication connection with the computing device. That is, an output signal generated by the control element of the body 100 may be transmitted to the computing device through the connection port 410. The keyboard 400 may be placed on a desktop for use, and the body 100 may be hung beside the keyboard 400 by adjusting a shape of the flexible conduit 300. Alternatively, the user may further adjust the shape of the flexible conduit 300, so that the body 100 may hang above the keyboard 400. In this way, not only the user can conveniently operate the computing device by using the keyboard 400 and the body 100, but also desktop space that the body 100 needs to occupy can be dramatically reduced because the body 100 is in a hung state.

In another embodiment, the keyboard 400 and the body 100 may also implement communication connection in a wireless manner. For example, the keyboard 400 and the connector 210 are respectively with built-in Bluetooth transceivers corresponding to each other. Therefore, the connector 210 does not need to be actually plugged into the connection port 410 of the keyboard 400 for communication connection with the keyboard 400. In this case, the user may dispose the body 100 more freely, for example, warp the flexible conduit 300 on armrests of a chair and hang the body 100 beside the armrests of the chair.

Figure 8:
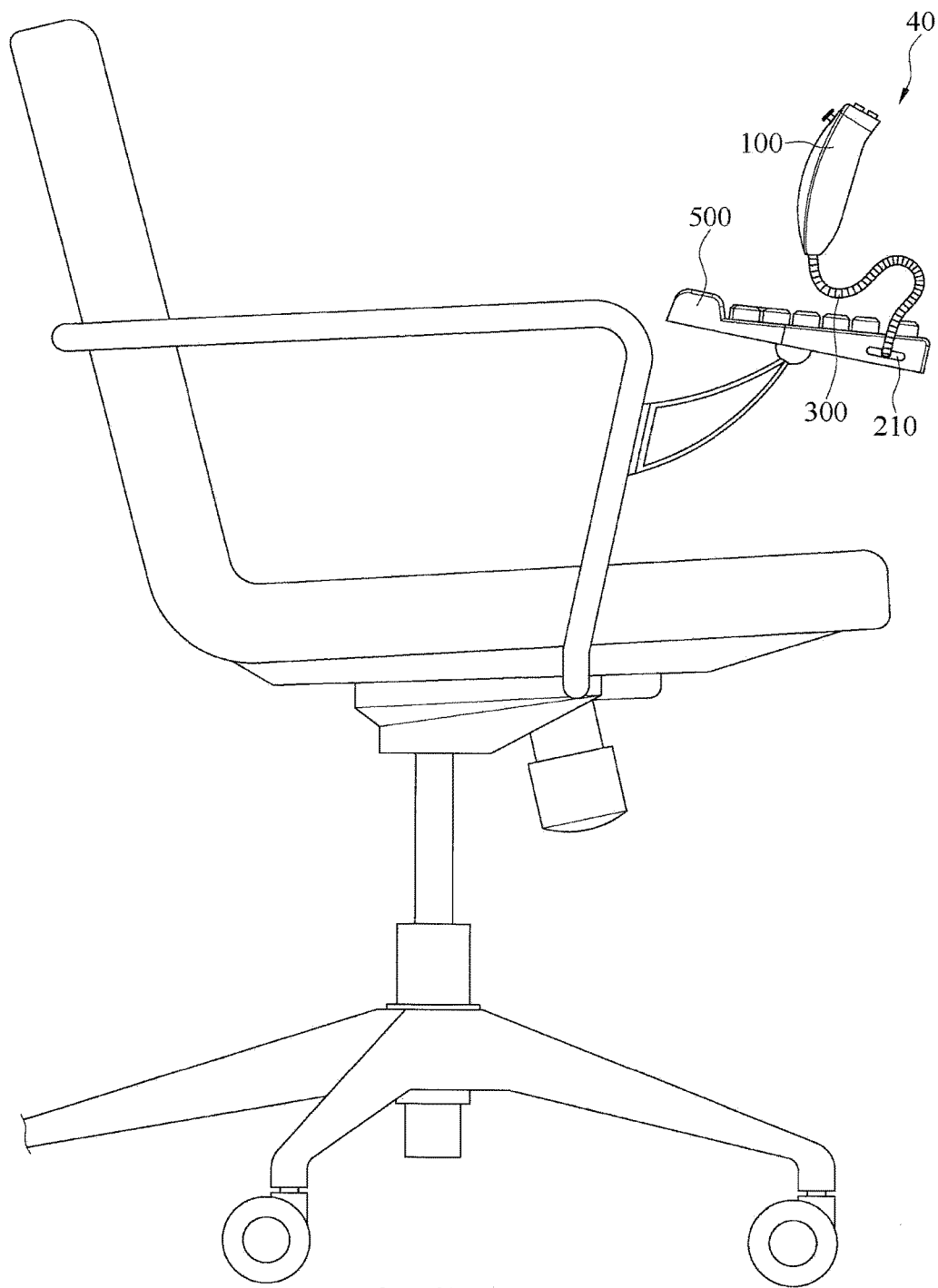
FIG. 8 is a schematic diagram of a manipulation apparatus according to a fourth embodiment of the present invention.

Referring to FIG. 8, FIG. 8 is a schematic diagram of a manipulation apparatus 40 according to a fourth embodiment of the present invention. Differences between the manipulation apparatus 40 of the fourth embodiment shown in FIG. 8 and the manipulation apparatuses 10 and 20 of the first and the second embodiments shown in FIG. 1 to FIG. 6 lie in that the manipulation apparatus 40 may further be configured to be connected to a keyboard set 500, that is, the manipulation apparatus 40 may be an extended apparatus of the keyboard set 500. Elements of the manipulation apparatus 40 of the fourth embodiment same as or similar to those of the manipulation apparatuses 10 and 20 of the first and the second embodiments are labeled with same element symbols or ellipses. For structures, connection relationships, and functions of the elements, refer to the foregoing descriptions, and details are not described herein again. The keyboard set 500 includes a left keyboard, a right keyboard, and a connection port (not shown in the figure). The left keyboard and the right keyboard are separated keyboards at a left side and a right side. The left keyboard and the right keyboard are in communication connection with each other (for example, the left keyboard and the right keyboard are connected in a wireless manner by using the Bluetooth technology). The left keyboard may be fixed to a left-side armrest (not shown in the figure) of the chair shown in FIG. 8 by using a holder (also known as a support, or a stand), and the right keyboard may be fixed to a right-side armrest (such as the armrest shown in FIG. 8) of the chair shown in FIG. 8 by using a holder. The keyboard set 500 of FIG. 8 may be in communication connection with a computing device, and the connection port is located above the right keyboard (where the connector 210 is plugged in). The connector 210 of the body 100 may be plugged into the connection port of the keyboard set 500 and electrically connected to the keyboard set 500, so that the control element of the body 100 may be in communication connection with the computing device. The body 100 may be hung beside or above the right keyboard of the keyboard set 500 by adjusting the flexible conduit 300 (as shown in FIG. 8). In this way, the user can comfortably sit on the chair shown in FIG. 8 and conveniently operate the computing device by means of the keyboard set 500 and the body 100. In addition, because the body 100 can be maintained in the hung state by being connected to the keyboard set 500 and by means of mutual supports of the keyboard set 500 and the flexible conduit 300, a fixed holder dedicated to placing the body 100 does not need to be additionally added on the armrests of the chair, thereby reducing costs and saving space.

When the manipulation apparatuses 30 and 40 of the third embodiment and the fourth embodiment are connected to the connection port 410 of the keyboard 400 or the connection port of the keyboard set 500, the manipulation apparatuses 30 and 40 can directly operate, by means of an appropriate device driver, the computing device in communication connection with the keyboard 400 or the keyboard set 500. The computing device is, for example, a personal computer, a notebook computer, a smartphone, a tablet computer, a smart television, a heads-up display device/a head-mounted display device/a virtual reality apparatus, or a television game console.

In different embodiments, the control element of the body 100 of the manipulation apparatuses 10, 20, 30, and 40 may further include a gravity sensor (G-sensor). The gravity sensor is also referred to as an accelerometer and may be configured to sense information of a speed and a displacement. In other words, when the user moves the body 100, the gravity sensor senses a speed and a displacement of the body 100, generates corresponding signals, and transmits the signals to the computing device for further application. In addition, the control element of the body 100 may further include a gyroscope. The gyroscope is also referred to as a turn meter and may be configured to detect information of an azimuth angle. That is, when the user holds and rotates the body 100, the gyroscope senses changes in angles, generates corresponding signals, and transmits the signals to a computer or a game console for further application. In a case in which the body 100 of the manipulation apparatuses 10, 20, 30, and 40 has the gravity sensor and the gyroscope, the body 100 may be used as a 3D controller and may be configured to operate a VR (virtual reality) apparatus. For example, the body 100 may perform 3D manipulation on application software or a game based on three-dimensional space; or the body 100 may further perform 3D manipulation in cooperation with a head-mounted VR apparatus.

In conclusion, according to the manipulation apparatus of each embodiment of the present invention, the flexible conduit is disposed outside the connection cable of the body in a sleeve manner. Because a shape of the flexible conduit may be adjusted by exerting a force of a particular degree thereon, and in a case in which no external force is exerted, the flexible conduit may maintain its adjusted shape by means of its own holding power. Therefore, a user may adjust a height, a location, and an angle of the body of the manipulation apparatus by using the flexible conduit, so that the body matches a hand posture of the user when the user operates the manipulation apparatus, and a degree of comfort of the user is improved. In addition, the flexible conduit can support the body so as to make the body hung in the air, thereby saving desktop space. Moreover, because the flexible conduit can help support the body, the user does not need to hold and raise the body only by means of strengths of the hand. In this way, the user does not easily feel tired in hand despite of long-time use of the body. Furthermore, when the body needs to be used in cooperation with the keyboard or the keyboard set, when the user needs to operate the keyboard, the user does not need to first lay down the body and then use the keyboard, but only need to release the body and operate the keyboard instead because the body maintains the location where the body is hung. Therefore, the manipulation apparatus is more convenient in use.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A manipulation apparatus, comprising:
a body capable of being held with one hand, wherein the body comprises a control element, a button, and a directional control lever, the control element is located in the body and is configured to receive a control signal generated by the button and the directional control lever, the button is located at a first side of the body, the directional control lever is located at a second side of the body, and a side of the first side is connected to a side of the second side;
a connection cable, connected to the control element, wherein the connection cable comprises a first end and a second end opposite to each other, and the first end is connected to a third side of the body, wherein a side of the third side is connected to another side of the second side far away from the first side, or a side of the third side is connected to another side of the first side far away from the second side;
a connector, connected to the second end of the connection cable; and a flexible conduit, disposed outside the connection cable in a sleeve manner, wherein the flexible conduit extends from the first end of the connection cable to the second end;
wherein the body further comprises a groove, the groove is recessed into the third side of the body, the first end of the connection cable is connected to the control element through the groove, a width of the groove is substantially equal to a diameter of the flexible conduit, and a part of the flexible conduit is selectively fitted in the groove,
wherein the groove is a cross and the first end of the connection cable is connected to the control element through a center of the cross of the groove.

2. The manipulation apparatus according to claim 1, wherein there are two buttons.

3. The manipulation apparatus according to claim 1, wherein the control element comprises a gravity sensor.

4. The manipulation apparatus according to claim 1, wherein the control element comprises a gyroscope.

5. The manipulation apparatus according to claim 1, wherein the manipulation apparatus is configured to be connected to a keyboard, and the connector is configured to be connected to a connection port of the keyboard.

6. The manipulation apparatus according to claim 1, wherein the manipulation apparatus is configured to be connected to a keyboard set, wherein the keyboard set comprises a left keyboard and a right keyboard, the left keyboard is in communication connection with the right keyboard, and the connector is configured to be connected to a connection port of the left keyboard or the right keyboard.

7. The manipulation apparatus according to claim 1, wherein the flexible conduit is made of metal.

* * * * *